United States Patent Office 2,966,405
Patented Dec. 27, 1960

2,966,405

CELLULOSE ESTER PROPELLANT COMPOSITIONS

Arthur W. Sloan, Washington, D.C., and Lester L. Weil, Alexandria, Va., assignors to Atlantic Research Corporation, Alexandria, Va., a corporation of Virginia No Drawing. Filed Jan. 3, 1955, Ser. No. 479,652

19 Claims. (Cl. 52—7)

This invention relates to a new and improved process for making propellants comprising plasticized cellulose esters as fuel and binder.

Plasticized cellulose esters such as cellulose acetate and other lower fatty acid esters of cellulose possess certain important advantages for use as a fuel and binder in propellant compositions. They burn readily, are free of halogen and form compositions of excellent tensile strength. However, processing cellulose acetate by methods hitherto in use requires mixing the polymer with the plasticizer and other additives in a kneader or masticating mill to form a stiff paste or dough and then extruding the mass under heat and pressure into the desired shape or introducing it into a mold and subjecting it to high temperatures and pressures. Where highly active oxidizing agents or active auto-oxidant materials are to be incorporated to provide propellant properties, procedures involving kneading, extrusion and molding under high temperatures and pressures are exceedingly hazardous. It is also difficult by such methods to mold grains of certain desired shapes and to make uniformly reproducible grains.

An alternative processing method, which involves making more fluid mixes by dissolving the cellulose acetate in a volatile solvent or dispersing it in an aqueous medium is of very limited application since, because of the necessity for volatilization of the solvent or dispersion medium, it can be employed only for the production of very thin coatings or films.

The object of this invention is to provide a process for making propellant grains of any desired shape or size comprising plasticized cellulose acetate or other lower fatty acid esters of cellulose as fuel and binder which does not require the removal of a dispersion medium or the application of high temperatures and pressures for mixing or molding.

Another object is to provide a process for making propellant grains comprising plasticized cellulose esters as fuel and binder, which are uniform in composition, readily reproducible and which reduce explosion and fire hazard to a minimum.

Other objects and advantages of our invention will become obvious from the following detailed description.

In co-pending Sloan and Mann application Serial Number 432,323, filed May 24, 1954, now Patent No. 2,809,120, it is disclosed that cellulose acetate or other lower fatty acid cellulose esters can be dispersed or suspended in a plasticizer to form a fluid suspension which is pourable, homogeneous and stable when the cellulose ester particles possess certain essential characteristics. We have discovered that highly effective propellant compositions can be made by incorporating a finely-divided, solid, active oxidizer into a fluid cellulose ester-plasticizer suspension. The plasticizer may be inert or an auto-oxidant material such as nitroglycerin. We have found, furthermore, that substantial amounts of the solid oxidizer can be incorporated into the cellulose ester-plasticizer suspension without destroying fluidity. The fluid mix can be poured into a mold of any desired shape or size or otherwise formed into films without requiring the application of high temperatures and pressures. Curing of the mixtures is accomplished simply by heating the molded mix to dissolve the cellulose ester in the plasticizer. There is no need for application of pressure. Curing temperatures can be maintained at levels which are well below autoignition temperature for the mixture. The safety factor in handling the propellant mixes according to our invention is, therefore, very large.

The cellulose ester is preferably a lower fatty acid ester such as the acetate, propionate, butyrate and the like. The acylating groups may be the same or mixed. In general, we prefer to use cellulose acetate or a mixed cellulose ester containing the acetyl group and other lower fatty acid groups such as cellulose acetate propionate, cellulose acetate butyrate, cellulose acetate sorbate and the like.

The cellulose ester particles must be substantially spherical. In other words, they should be true spheres or closely approximate spheres such as spheroids. The particles should have a maximum diameter of about 100 microns and be substantially nonporous. In the case of cellulose acetate, for example, minimum density is desirably about 1.2 and preferably about 1.3. It is these properties which make possible formation of fluid, pourable, homogeneous, stable suspensions of the particles in plasticizers.

Preferably the maximum average particle size is about 50 microns. In other words, the size distribution of the particles is desirably such that the maximum average by number is about 50 microns. Larger particles as, for example, those ranging in size from 50 to 100 microns, can be dispersed in plasticizer to form fluid suspensions which are stable, though of shorter shelf life than those formed by smaller particles. Where the suspension is to be employed soon after formation, this is of no moment. In general, the maximum particle size which can be tolerated is about 100 microns. Above this size the particles tend to sediment rapidly and present curing problems since the plasticizer may not adequately penetrate to the core of the large particle. Particle sizes ranging up to about 10 or 25 microns are generally optimum.

The plasticizer may be any suitable non-volatile, high boiling liquid which solvates the cellulose ester slowly at ordinary temperatures and with relative rapidity at elevated temperatures. To some extent shelf life of the suspensions is determined by the solvent rate of the plasticizer at normal temperatures. The more readily the cellulose ester is solvated at room temperature, the shorter is the shelf life because of gelation of the composition. Where the suspension is to be employed within a relatively short time after preparation, this is no deterrent. Where an extended shelf life and maximum fluidity is desired, it is preferable to choose a plasticizer having a very slow solution rate at normal temperatures.

As aforementioned, the plasticizer may be inert, namely one which requires an external oxidizing agent for combustion, or it may be an active auto-oxidant such as nitroglycerin, namely a compound containing sufficient combined oxygen to oxidize other components of the molecule.

Suitable inert plasticizers for the cellulose esters such as cellulose acetate, include, for example, phthalates such as dimethyl phthalate, diethyl phthalate, dimethoxyethyl phthalate, diethoxyethyl phthalate, ethyl phthalyl ethyl glycolate and methyl phthalyl ethyl glycolate, acetates such as glyceryl triacetate, butylene glycol diacetate and cresyl glyceryl diacetate, citrates such as triethyl citrate and acetyl triethyl citrate, phosphates such as triphenyl phosphate, sulfonamides such as the N-ethyl o- and p-toluene sulfonamides, maleates such as diethylene glycol dipropionate, etc. Examples of auto-oxidant type plasticizers include nitroglycerin, ethylene glycol di-nitrate, methriol tri-nitrate and butane-triol tri-nitrate. Choice of plasticizer is largely determined by the specific properties desired in the propellant product. Two or more plasticizers can be employed for their individual properties. For example, an auto-oxidant plasticizer may be combined with an inert plasticizer. Non-solvent type plasticizers can also be used for their specific properties, such as increasing tensile strength and hardness. However, the non-solvent type plasticizers should be used in combination with a solvent-type plasticizer.

Any desired proportion of plasticizer to cellulose ester may be employed so long as sufficient is used to give the mixture a fluid, pourable consistency. The amount employed will vary to some extent according to the particular plasticizer used and the properties desired in the cured propellant product. In general, the higher the ratio of cellulose ester to plasticizer, the tougher and harder the product. For most purposes, the minimum practical ratio of cellulose ester to plasticizer is about 2 to 3 since smaller proportions of the cellulose ester may result in products which are too soft, although in some cases a ratio of 1 to 2 may be satisfactory. A preferred ratio of cellulose ester to plasticizer is about 1 to 1. The specific proportions of any given plasticizer needed to produce the desired physical properties can readily be determined by the skilled practitioner.

To obtain the desired propellant properties, it is essential that an active oxidizing agent be incorporated to oxidize the cellulose ester and the plasticizer if the latter is of the inert type. Thus the plasticized cellulose ester functions both as fuel and binder in the propellant compositions. Where the plasticizer is of the auto-oxidant type such as nitro-glycerin, the oxidizer is essential only to provide for combustion of the cellulose ester.

Finely-divided solid oxidizers which are insoluble in the plasticizer can be incorporated into the cellulose ester-plasticizer suspensions in considerable quantity without increasing viscosity of the suspension to the point where it is no longer pourable or requires excessive proportions of the plasticizer. The oxidizer solids, furthermore, are intimately and homogeneously dispersed both in the suspension and in the finished, cured composition.

Any suitable, finely divided oxidizer, namely any oxidizing agent which yields oxygen actively and readily, may be employed, such as ammonium, sodium and potassium perchlorates, ammonium, sodium, potassium and barium nitrates, and the like. For reasons of stability, the inorganic oxidizers are preferable. However, organic oxidizers such as hexanitroethane, mannitol hexanitrate, cyclotrimethylene trinitramine and the like may also be used if satisfactorily desensitized.

The amount of oxidizer incorporated is determined largely by the specific components of the mix and the specific properties, such as burning rate, specific impulse and the like, desired in the propellant product. Where the plasticizer comprises, at least in part, an auto-oxidant material, the external oxidizer requirement is, of course, reduced.

The cellulose ester-plasticizer-oxidizer suspensions are easily prepared by mixing the components with sufficient agitation to produce a homogeneous mix. For the most part mixing is done at normal or room temperature and preferably at a temperature not exceeding about 35° C., although in the case of some plasticizers the temperature may be as high as 50° C., to avoid excessive solvation of the cellulose ester and undue increase in viscosity. The resulting mix is a stable, homogeneous, fluid suspension of the small, spherical cellulose ester particles.

The fluid suspensions are, normally, sufficiently fluid to pour rapidly. In some cases, the viscosity of the mix may be such that pouring rate is somewhat slow and for manufacturing expediency it may be desirable to accelerate pouring by the application of slight pressures. However, even the more viscous suspensions are sufficiently fluid to fill and conform to the shape of a mold without application of heat or pressure.

The suspensions, after being molded, are cured by heating until the cellulose ester dissolves in the plasticizer with consequent gelation and setting. Although solvation rate increases with increasing temperature, it is advisable to maintain temperatures which are well below auto-ignition temperature. The specific temperature and curing time are largely determined by the particular plasticizer and oxidizing agent. Where an auto-oxidant plasticizer, such as nitroglycerin, is employed, it is generally advisable not to heat much above about 115–120° C. Higher temperatures can usually be employed when the plasticizer is inert. The smallness of the cellulose ester particles enhances rapidity and completeness of cure and ensures homogeneity of the product since the plasticizer can readily penetrate to the core of the small particles.

Since there is no appreciable sedimentation of the cellulose ester particles during curing, the products are uniform in composition throughout and are readily reproducible from suspensions of similar composition. In general, they are tough, non-brittle solids possessing excellent physical and propulsive properties.

The following examples are illustrative of our invention but, it will be understood, are in no way limiting.

EXAMPLE I

10% by weight of cellulose acetate in the form of dense, substantially spherical particles 1 to 15 microns in diameter, 15% of dioctyl phthalate and 75% of finely divided ammonium perchlorate were mixed with agitation until a homogeneous suspension was formed of the solid particles in the plasticizer. The suspension was poured into a mold and cured by heating at a temperature of 140–145° C. for about 20 minutes.

EXAMPLE II

10% by weight of cellulose acetate in the form of dense, substantially spherical particles 1–15 microns in diameter, 15% of triacetin and 75% of finely divided ammonium perchlorate were mixed with agitation to form a homogeneous, pourable suspension. The suspension was poured into a mold and cured at 140–145° C. for about 15 minutes.

EXAMPLE III 12 parts of cellulose acetate in the form of dense, substantially spherical particles up to about 25 microns in diameter, 18 parts of diethyl phthalate and 70 parts of ammonium perchlorate were processed as in Example I. The suspension was poured into a mold and cured at 150–155° C. for 5 minutes.

EXAMPLE IV 24 parts of cellulose acetate sorbate in the form of dense, substantially spherical particles up to about 25 microns in diameter, 36 parts of diethyl phthalate and 180 parts of ammonium perchlorate were processed as in Example I. The fluid suspension was poured into a mold and cured at 220° F. for 1 hour.

EXAMPLE V 30.8 parts of cellulose acetate sorbate in the form of dense, substantially spherical particles up to about 25 microns in diameter, 46.2 parts of diethyl phthalate and 180 parts of ammonium perchlorate were processed as in Example I. The fluid suspension was poured into a mold and cured at 220° F. for 1 hour.

Table I lists additional representative propellant formulations which were prepared according to the foregoing examples. Particle size of the cellulose acetate ranged up to about 50 microns in diamter. The percentage composition is given by weight.

Table 1

| Cellulose acetate | Plasticizer | Ammonium perchlorate, percent |
| --- | --- | --- |
| 12% | Triethylene glycol diacetate, 9%<br>Diethyl phthalate, 9% | 70 |
| 10% | Diethyl phthalate, 15% | 75 |
| 18% | Diethyl phthalate, 13.5%<br>Nitroglycerin, 13.5% | 55 |
| 16% | Diethyl phthalate, 12%<br>Nitroglycerin, 12% | 60 |
| 10% | Diethyl phthalate, 10%<br>Nitroglycerin, 10% | 70 |
| 13.3% | Diethyl phthalate, 10.7%<br>Nitroglycerin, 16% | 60 |

Although this invention has been described with reference to illustrative embodiments thereof, it will be apparent to those skilled in the art that it may be embodied in other forms but within the scope of the appended claims.

We claim:

1. A propellant composition which is a fluid, pourable, substantially homogeneous suspension of lower fatty acid cellulose ester and finely divided solid, insoluble, active oxidizer in a liquid vehicle consisting essentially of non-volatile plasticizer which dissolves the cellulose ester readily only at temperatures of at least about 50° C., the cellulose ester serving as fuel and being in the form of substantially spherical, substantially non-porous particles having a maximum diameter of about 100 microns, said oxidizer being present in amount to provide for combustion and to maintain burning rate.

2. A propellant composition which is a fluid, pourable, substantially homogeneous suspension of lower fatty acid cellulose ester and finely divided solid, insoluble, active oxidizer in a liquid vehicle consisting essentially of non-volatile plasticizer which dissolves the cellulose ester readily only at temperatures of at least about 50° C., the cellulose ester serving as fuel and being in the form of substantially spherical, substantially non-porous particles having a maximum diameter of about 50 microns, said oxidizer being present in amount to provide for combustion and to maintain burning rate.

3. A propellant composition which is a fluid, pourable, substantially homogeneous suspension of lower fatty acid cellulose ester and finely divided solid, insoluble active oxidizer in a liquid vehicle consisting essentially of non-volatile plasticizer which dissolves the cellulose ester readily only at temperatures of at least about 50° C., the cellulose ester serving as fuel and being in the form of substantially spherical, substantially non-porous particles having a maximum diameter of about 25 microns, said oxidizer being present in amount to provide for combustion and to maintain burning rate.

4. The composition of claim 1 in which the cellulose ester is cellulose acetate.

5. The composition of claim 2 in which the cellulose ester is cellulose acetate.

6. The composition of claim 5 in which the cellulose acetate has a minimum density of about 1.2.

7. The composition of claim 3 in which the cellulose ester is cellulose acetate.

8. A propellant composition which is a fluid, pourable, substantially homogeneous suspension of cellulose acetate and finely divided, solid, insoluble, active oxidizer in a liquid vehicle consisting essentially of non-volatile plasticizer which dissolves the cellulose ester readily only at temperatures of at least about 50° C., the cellulose acetate serving as a fuel being in the form of substantially spherical, substantially non-porous particles having a maximum diameter of about 100 microns, the plasticizer comprising, at least in part, a compound containing sufficient combined oxygen to oxidize other components of the molecule, said oxidizer being present in amount to provide for combustion and to maintain burning rate.

9. A propellant composition which is a fluid, pourable, substantially homogeneous suspension of cellulose acetate and finely divided, solid, insoluble, active oxidizer in plasticizer consisting essentially of nitroglycerin and liquid non-volatile plasticizer which dissolves the cellulose ester readily only at temperatures of at least about 50° C. and which requires external oxidizer for combustion, the cellulose acetate serving as fuel and being in the form of substantially spherical, substantially non-porous particles having a maximum diameter of about 50 microns, said oxidizer being present in amount to provide for combustion and to maintain burning rate.

10. A process for making propellant compositions which comprises admixing lower fatty acid cellulose ester in the form of substantially spherical, substantially non-porous particles having a maximum diameter of about 100 microns and finely divided, solid, insoluble, active oxidizer with a liquid vehicle consisting essentially of non-volatile plasticizer which dissolves the cellulose ester readily only at temperatures of at least about 50° C., the plasticizer being incorporated in amount sufficient to form a pourable fluid suspension, and heating the mixture to dissolve the cellulose ester in the plasticizer and to form a solid, propellant composition, said cellulose ester serving as fuel, said oxidizer being present in amount to provide for combustion and to maintain burning rate.

11. A process for making propellant compositions which comprises admixing lower fatty acid cellulose ester in the form of substantially spherical, substantially non-porous particles having a maximum average diameter of about 50 microns and finely divided, solid, insoluble, active oxidizer with a liquid vehicle consisting essentially of non-volatile plasticizer which dissolves the cellulose ester readily only at temperatures of at least about 50° C., the plasticizer being incorporated in amount sufficient to form a pourable, fluid suspension and heating the mixture to dissolve the cellulose ester in the plasticizer and to form a solid, propellant composition, said cellulose ester serving as fuel, said oxidizer being present in amount to provide for combustion and to maintain burning rate.

12. A process for making propellant compositions which comprises admixing lower fatty acid cellulose ester in the form of substantially spherical, substantially non-porous particles having a maximum diameter of about 25 microns and finely divided, solid, insoluble, active oxidizer with a liquid vehicle consisting essentially of non-volatile plasticizer which dissolves the cellulose ester readily only at temperatures of at least about 50° C., the plasticizer being incorporated in amount sufficient to form a pourable, fluid suspension, and heating the mixture to dissolve the cellulose ester in the plasticizer and to form a solid, propellant composition, said cellulose ester serving as fuel, said oxidizer being present in amount to provide for combustion and to maintain burning rate.

13. The process of claim 10 in which the cellulose ester is cellulose acetate.

14. The process of claim 11 in which the cellulose ester is cellulose acetate.

15. The process of claim 14 in which the cellulose acetate has a minimum density of about 1.2.

16. The process of claim 12 in which the cellulose ester is cellulose acetate.

17. A process for making propellant compositions which comprises admixing cellulose acetate in the form of substantially spherical, substantially non-porous particles having a maximum diameter of about 100 microns and finely divided, solid, insoluble, active oxidizer with a liquid vehicle consisting essentially of non-volatile plasticizer which dissolves the cellulose acetate readily only at temperatures of at least about 50° C., the plasticizer being incorporated in amount sufficient to form a pourable, fluid suspension and comprising, at least in part, a compound containing sufficient combined oxygen to oxidize other components of the molecule, and heating the mixture to dissolve the cellulose ester in the plasticizer and to form a solid propellant composition, said cellulose ester serving as fuel, said oxidizer being present in amount to provide for combustion and to maintain burning rate.

18. A propellant composition which is a fluid, pourable, substantially homogeneous suspension of cellulose acetate sorbate and finely divided solid, insoluble, active oxidizer in a liquid vehicle consisting essentially of nonvolatile plasticizer which dissolves the cellulose ester readily only at temperatures of at least about 50° C., the cellulose acetate sorbate serving as fuel and being in the form of substantially spherical, substantially nonporous particles having a maximum average diameter of about 50 microns and a maximum diameter of about 100 microns, said oxidizer being present in amount to provide for combustion and to maintain burning rate.

19. A process for making propellant compositions which comprises admixing cellulose acetate sorbate in the form of substantially spherical, substantially nonporous particles having a maximum average diameter of about 50 microns and a maximum diameter of about 100 microns and finely divided, solid, insoluble, active oxidizer with a liquid vehicle consisting essentially of nonvolatile plasticizer which dissolves the cellulose ester readily only at temperatures of at least about 50° C., the plasticizer being incorporated in amount sufficient to form a pourable, fluid suspension, and heating the mixture to dissolve the cellulose acetate sorbate in the plasticizer and to form a solid, propellant composition, said cellulose ester serving as fuel, said oxidizer being present in amount to provide for combustion and to maintain burning rate.

References Cited in the file of this patent

UNITED STATES PATENTS

| | | |
|---|---|---|
| 649,852 | Luck | May 15, 1900 |
| 1,778,718 | Hill | Oct. 21, 1930 |
| 1,940,255 | Johnson | Dec. 19, 1933 |
| 2,674,526 | Reinhart | Apr. 6, 1954 |
| 2,809,120 | Sloan et al. | Oct. 8, 1957 |

FOREIGN PATENTS

| | | |
|---|---|---|
| 588,671 | Great Britain | May 30, 1947 |